US008817772B2

(12) United States Patent
Westman et al.

(10) Patent No.: US 8,817,772 B2
(45) Date of Patent: Aug. 26, 2014

(54) FUNCTION MODE ROUTING

(75) Inventors: Ilkka Westman, Helsinki (FI); Miikka Poikselka, Espoo (FI)

(73) Assignee: Nokia Corporation, Espoo (FI)

( * ) Notice: Subject to any disclaimer, the term of this patent is extended or adjusted under 35 U.S.C. 154(b) by 2070 days.

(21) Appl. No.: 10/870,230

(22) Filed: Jun. 18, 2004

(65) Prior Publication Data

US 2005/0002381 A1 Jan. 6, 2005

(30) Foreign Application Priority Data

Jul. 2, 2003 (GB) .................................. 0315502.5
Oct. 22, 2003 (EP) .................................... 03023964

(51) Int. Cl.
*H04L 12/66* (2006.01)

(52) U.S. Cl.
USPC .......................................... 370/352; 370/392

(58) Field of Classification Search
CPC ............ H04L 65/1006; H04L 65/1016; H04L 65/1069; H04L 65/1063; H04L 65/1043; H04L 65/1073; H04L 65/103; H04L 65/1036; H04L 65/105; H04L 65/1046; H04L 67/14; H04L 29/06; H04L 65/1066
USPC .................... 370/352–356, 389, 395.32, 409, 370/392–395.31; 709/238–242
See application file for complete search history.

(56) References Cited

U.S. PATENT DOCUMENTS 4,360,910 A * 11/1982 Segal et al. ................... 370/266
5,734,903 A * 3/1998 Saulpaugh et al. ........... 719/316
6,175,743 B1 * 1/2001 Alperovich et al. .......... 455/466
6,535,908 B1 * 3/2003 Johnson et al. ............... 707/613
7,151,753 B2 * 12/2006 Chaney et al. ................ 370/261
8,315,258 B2 * 11/2012 Westman et al. ............. 370/389
2002/0071429 A1 * 6/2002 Donovan ...................... 370/352
2003/0021238 A1 1/2003 Corneliussen et al.
2003/0043740 A1 * 3/2003 March et al. .................. 370/229
2004/0028080 A1 * 2/2004 Samarasinghe et al. ...... 370/486
2004/0037406 A1 * 2/2004 Gourraud ................. 379/202.01

FOREIGN PATENT DOCUMENTS

WO WO 02/13567 A1 2/2002
WO WO-02/087265 A2 10/2002
WO WO 02/09365 A1 1/2003
WO WO-03030429 A2 4/2003

OTHER PUBLICATIONS

"Digital cellular telecommunications system (Phase 2+); Universal mobile Telecommunications System (UMTS); IP Multimedia (IM) session handling; IM call model; Stage2 (3GPP TS 23.218 version 5.5.0 Release 5)", ETSI TS 123 218 V5.5.0 Jun. 2003, pp. 1-57.

"Telecommunications and Internet Protocol Harmonization Over Networks (TIPHON) Release 3; Technology Mapping; implementation of TIPHON architecture using SIP", ETSI TS 101 884 V1.1.1 Sep. 2002, pp. 1-53.

(Continued)

*Primary Examiner* — Fan Tsang
*Assistant Examiner* — Akelaw Teshale
(74) *Attorney, Agent, or Firm* — Mintz, Levin, Cohn, Ferris, Glovsky, & Popeo, P.C.

(57) ABSTRACT

Methods and entities of routing messages to or from a network entity in an IP network is disclosed. A function mode is indicated in a message routed to or from the network entity.

16 Claims, 12 Drawing Sheets

(56) References Cited

OTHER PUBLICATIONS

"Public Service Identity Routing", XP-002295617, S2-030913, Feb. 24, 2003, pp. 1-5.
Third Generation Partnership Project (3GPP) TS 23.002 v5.4.0 (Oct. 2001).
Third Generation Partnership Project (3GPP) TS 23.002 v6.1.0 (Jun. 2003).
Third Generation Partnership Project (3GPP) TS 23.107 v3.4.0 (Oct. 2000).
Third Generation Partnership Project (3GPP) TS 23.228 v5.2.0 (Oct. 2001).
Third Generation Partnership Project (3GPP) TS 23.228 v6.2.0 (Jun. 2003).
Third Generation Partnership Project (3GPP) TS 23.228 v6.3.0 (Sep. 2003).
Third Generation Partnership Project (3GPP) TS 24.229 v5.5.0 (Jun. 2003).
Third Generation Partnership Project (3GPP) TS 24.228 v5 4.0 (Mar. 2003).
Third Generation Partnership Project (3GPP) TR 29.847 v1.4.0 (Apr. 2004).
Third Generation Partnership Project (3GPP) TS 32.200 v5.4.0 (Jun. 2003).
Third Generation Partnership Project (3GPP) TS 33.210 v6.2.0 (Jun. 2003).
Third Generation Partnership Project (3GPP) TSG-SA WG2 Meeting #33, Jul. 7-11, 2003, "Change Request".
RFC 2396 (RFC2396) Uniform Resource Identifiers (URI): Generic Syntax, Network Working Group, T. Berners-Lee et al., Aug. 1998.
Network Working Group, Request for Comments: 3261 (rfc3261.txt), J. Rosenberg et al., Jun. 2002.
Caller Preferences for the Session Initiation Protocol (SIP) (draft-ietf-sip-callerprefs-10), J. Rosenburg et al., Oct. 22, 2003.
Indicating User Agent Capabilities in the Session Initiation Protocol (SIP) (draft-ietf-sip-callee-caps-03), J. Rosenburg et al., Dec. 24, 2003.
Ad-Hoc URI List Management in the Session Initiation Protocol (SIP) (draft-camarillo-sipping-adhoc-management-00.txt), G. Camarillo, Feb. 6, 2004.
Session Initiation Protocol Call Control—Conferencing for User Agents (draft-ietf-sipping-cc-conferencing-03), A. Johnston et al., Feb. 14, 2004.
A Session Initiation Protocol (SIP) Event Package for Modification Events for the Extensible Markup Language (XML) Configuration Access Protocol (XCAP) Managed Documents (draft-ietf-simple-xcap-package-01), J. Rosenburg et al., Feb. 16, 2004.
Sanjeev Kayath, "Signalling Flows for the IP Multimedia Call Control Based on Sip in 3G Wireless Network", Project Submitted in Partial Fulfilment of the Requirements of Master of Science in Electrical Engineering, University of Illinois at Chicago, Jan. 2002.
3GPP TS 23.228 V6.2.0 (Jun. 2003); 3rd Generation Partnership Project; Technical Specification Group Services and System Aspects; IP Multimedia Subsystem (IMS); Stage 2 (Release 6).
3GPP TSG-SA2 Meeting #30,"SIP Routing of Public Service Identity", Milan, Italy, Feb. 24-28, 2003.

* cited by examiner

FUNCTION MODE ROUTING

FIELD OF THE INVENTION

In general, the present invention relates to Internet Protocol (IP) networks, IP multimedia networks, IP Multimedia (IM) Core Network (CN) subsystems and call control. In particular, the present invention relates to routing sessions, messages and transactions provided with a function mode in an IP network.

BACKGROUND OF THE INVENTION

Application Server (AS) originated sessions/transactions with public user identity (PUI) as the originator are routed via Serving Call Session Control Functions (S-CSCFs). Routing from a User Agent Client (UAC) (e.g. AS) to a Session Initiation Protocol (SIP) proxy (e.g. Interrogating (I)-CSFC) is normal routing according to SIP. Moreover, a UAC can route to an outbound proxy in case the routing to the destination is not clear.

With the introduction of standardized presence, messaging, conferencing, and group service capabilities in an IM CN subsystem, there is a need for Public Service Identities (PSIs). These identities are different from the Public User Identities in the respect that they identify services, which are hosted by application servers. In particular, Public Service Identities are used to identify groups. For example a chat-type service may use a Public Service Identity (e.g. sip:chatlist_@(example-.com) to which the users establish a session to be able to send and receive messages from other session participants.

Public Service Identities should take the form of a SIP URL or the "tel:"-URL format. The IM CN subsystem should provide the capability for users to create, manage, and use Public Service Identities under control of an AS (Application Server). It should be possible to create statically and dynamically a Public Service Identity. Each Public Service Identity is hosted by an application server, which executes the service specific logic as identified by the Public Service Identity.

The IM CN Subsystem should provide capability of routing IMS messages using a Public Service Identity.

Depending on the service nature, different mechanisms may be used for configuration and routing of PSIs according to an operator preference. When PSIs are created, the uniqueness of a PSI shall be ensured. Whenever possible, routing to/from a Public Service Identity (PSI) should be provided using basic principles used for IMS routing.

The application server hosting the PSI may be invoked as an originating application server. This can be achieved by modifying filter information within the subscription information of the users intending to use the service identified by the PSI. The PSI is then made available to these users. Then, the SIP requests are directed to the corresponding application server hosting the service according to the originating filtering rules in the S-CSCF of the user who is using the service.

However, such statically pre-configured PSIs are only available internally within the IMS of the operator's domain.

Furthermore, the application server hosting the PSI may be invoked as a terminating application server with the AS and related PSIs configured in the home network, e.g. HSS. Such PSIs are globally routable and can be made available to users within and outside the operator domain, and can take the following form:

Distinct PSIs (e.g. my_service@example.com).

Wildcarded PSIs (chatlist_*@example.com): A range of PSIs with the same domain part in the SIP URI is defined using a wildcard indication in the userpart of the SIP-URI. Distinct PSIs can be created or deleted within the wildcarded range by the users using the Ut interface, or by the operator via O&M mechanisms.

For both the distinct PSIs and wildcarded PSIs, there are two ways to route towards the AS hosting the PSI:

a) The HSS maintains the assigned S-CSCF information and ISC (Reference Point between a CSCF and an Application Server) Filter Criteria to route to the AS hosting the PSI according to IMS routing principles. In this case, the I-CSCF receives SIP requests at the terminating side, queries the HSS and directs the request to the S-CSCF assigned to the PSI. The S-CSCF forwards the session to the application server hosting the PSI according to the terminating ISC Filter Criteria.

b) The home database maintains the address information of the AS hosting the PSI. In this case, the AS address information for the PSI is returned to the I-CSCF in the location query response, in which case the I-CSCF will forward the request directly to the AS hosting the PSI.

The AS hosting the PSI may originate requests with the PSI as the originating party. For such originating requests, the home IMS network should be capable to perform the following functions:

In case network configuration hiding is to be applied, the request should be routed by using a Topology Hiding Inter-network Gateway (THIG) function in the I-CSCF (referred to as I-CSCF(THIG)) or other techniques to hide the configuration, capacity, and topology of the network from the outside. When an I-CSCF(THIG) is chosen to meet the hiding requirement then for sessions traversing across different operators domains, the I-CSCF(THIG) may forward the SIP request or response to another I-CSCF(THIG) allowing the operators to maintain configuration independence. This means that the last hop within the originating IMS is an I-CSCF (THIG), which processes the request further on and routes it towards the destination network.

Network Domain Security should be used where applicable.

Charging requirements such as providing appropriate accounting and charging functions via the charging entities should be supported.

In case the target identity is a tel: URL, ENUM translation needs to be performed, and the request should be routed based on the translation result.

Routing from the Originating AS hosting the PSI can be performed as follows:

a) The AS may forward the originating request to the destination network without involving a S-CSCF. If this option is applied where the target identity is a tel: URL, the AS performs an ENUM query and routes the request based on the translation result. ENUM support for an AS is optional. If an AS does not support ENUM, it should be configured to use b) at least in case of tel: URLs.

b) In case the PSI has a S-CSCF assigned, the AS forwards the originating request to this S-CSCF, which then processes the request as per regular originating S-CSCF procedures.

To prevent fraudulent or unsecure IMS traffic possibly caused by AS originated requests, security and authentication procedures may be performed towards the AS.

SUMMARY OF THE INVENTION

It is an object of the present invention to provide a routing mechanism for requests, responses, messages, sessions, transactions and alike associated to function modes in an IP multimedia network.

Moreover, it should be possible to use a function mode such as a PSI regardless of which network has created the function mode. In addition, ASs from different vendors should be enabled to use the same PSIs.

Furthermore, if ASs are used to offer services to user originated/terminated sessions/transactions e.g. with charging AS, the same services should also be offered to PSI originated/terminated sessions/transactions.

According to the present invention, methods and entities of routing messages to or from a network entity in an IP network are disclosed. A function mode is indicated in a message routed to or from the network entity.

The present invention may also be implemented as computer program product.

According to the present invention, messages are routed to or from a network entity in an IP network, wherein in a message a function mode is indicated. In other words, information of the function mode is carried to or from a network entity, e.g. an S-CSCF, AS, etc. PSI (public service identity), orig-PSI (originating PSI), term-PSI (terminating PSI) are examples of such modes. The indication of the function mode may be carried in whatever header or field of a message (e.g. request, response, standalone transaction, etc) or in the message body or in one or more parameters of names (URIs) addresses headers or the like.

According to an embodiment of the present invention, requests are routed to or from a hosting entity (e.g. a host, an AS) hosting a function mode such as a service identified by a service identity in an IP network, wherein in a request the function mode is indicated, e.g. in the request it is indicated that an identity is a service identity (PSI). PSI is an instance of service identity.

A function mode indication such as a PSI indication may be supplied to a serving entity (S-CSCF) serving the hosting entity, from which indication it can be determined that an originator identity is a service identity. The PSI indication may be supplied in a request sent from the hosting entity as originating entity to the serving entity.

The hosting entity may determine the serving entity to be used by means of a query of a storage device (PSI DB) storing serving entities associated with function modes, e.g. service identities.

In the PSI indication it may be indicated that the originator identity is an originating service identity (orig-PSI) and that the desired function mode is the originating mode.

A locator entity (SLF/HSS) may indicate to an interrogating entity (I-CSCF) supporting routing towards the hosting entity as terminating entity that a destination identity is a service identity. This indication may be a result of a query to find the hosting entity.

The interrogating entity may indicate to the serving entity or to the hosting entity that the destination identity is a service identity. The indication may be included in a request sent from the interrogating entity to the serving entity or to the hosting entity. Alternatively, the serving entity may supply the indication to the hosting entity.

It may be indicated that the destination identity is a terminating service identity (term-PSI) and that the desired function mode is the terminating mode.

Upon receiving the PSI indication at the serving entity either from the hosting entity or the interrogating entity, for example, processing to be performed for identities different from a service identity may be skipped. Moreover, the service identity may be processed at the serving entity on the basis of processing data (FC) stored in a storage device (FC DB).

Furthermore, in the storage device (FC DB; PSI DB) processing data associated with function modes such as service identities may be stored, and, in addition, serving entities associated with function modes, e.g. service identities may be stored.

It is to be noted that in the above and the following description of the present invention the “service identity” as well as “PSI” (public service identity) may be an individual service identity as well as a function mode to take care of or handle these identities.

With the PSI indication in AS originating PSI routing according to a first embodiment of the invention, an analogous solution as for Public User Identities can be achieved. Moreover, the S-CSCF already contains all that is needed for routing requests further, so no further definitions are required in the S-CSCF. The needed modification of the S-CSCF is the addition of the capability to avoid all public user identity specific functionality, e.g. current user filter criteria evaluation.

Furthermore, elaborated routing capabilities are not duplicated to ASs. This means simpler and cheaper ASs, which are also easier to configure and maintain. In addition, IMS charging is done in the S-CSCF and not in the AS, which may be maintained by a third party service operator. Finally, an E. 164 NUMber (ENUM) database is not required to be revealed to service operators maintaining ASs.

According to a second embodiment of the invention, with the use of new PSI filter criteria in the S-CSCF which already has capabilities to handle (user) filter criteria, one or more other ASs can be visited similarly as in the public user identity case before further routing to the terminating AS. Moreover, because PSIs are not registered, they need not be stored in HSSs.

Furthermore, the storage for the filter criteria may be e.g. a file, table, list or alike or whatever between a simple database and a complicated database depending on the needs to associate PSI filter criteria to independent PSIs.

According to a third embodiment of the invention, the capability of the Subscription Locator Function/Home Subscriber Server (SLF/HSS) to return the PSI indication allows the use of Statically Created PSIs from external networks. Furthermore, it is possible to handle differently PSIs and ordinary Public User Identities at the target host (normally S-CSCF or AS).

With a PSI indication in AS terminating PSI routing according to a fourth embodiment of the invention it is possible to handle differently PSIs and ordinary Public User Identities on the same host (e.g. AS) even if the requests otherwise are similar.

The use of separate originating and terminating PSI filter criteria according to a fifth embodiment of the invention allows an evaluation of different filter criteria sets in originating and terminating cases.

With the provision of a PSI database according to a sixth embodiment of the invention ASs possibly from different vendors can maintain a common database of used PSIs. This enables a more fault tolerant system because the same service can be offered by another AS when the correct one fails and the data associated to the PSI can be obtained from the common database. Moreover, an AS does not need a separate database to store the PSIs that it hosts. In addition, several ASs can host the same PSI.

With a PSI database with S-CSCF name/address according to a seventh embodiment of the invention, only one S-CSCF may be allocated to a PSI. In the sixth embodiment, each PSI range may be associated to one or two or more S-CSCFs, the name/address of which is stored in an SLF/HSS and on hosts (e.g. ASs) that host the PSIs in the range.

However, according to the seventh embodiment, because a PSI is associated with a certain S-CSCF, a more complicated PSI DataBase (DB) is needed as well as processes to store/retrieve an S-CSCF name/address to/from the PSI DB.

As can be understood from the foregoing and from the description of the embodiments of the invention, the terms "service identity" and "PSI" (public service identity) may denote an individual service identity as well as a function mode to take care of or handle these identities.

In the following, the present invention will be described by way of preferred embodiments thereof taking into account the accompanying drawings.

DESCRIPTION OF THE PREFERRED EMBODIMENTS

Figure 1:
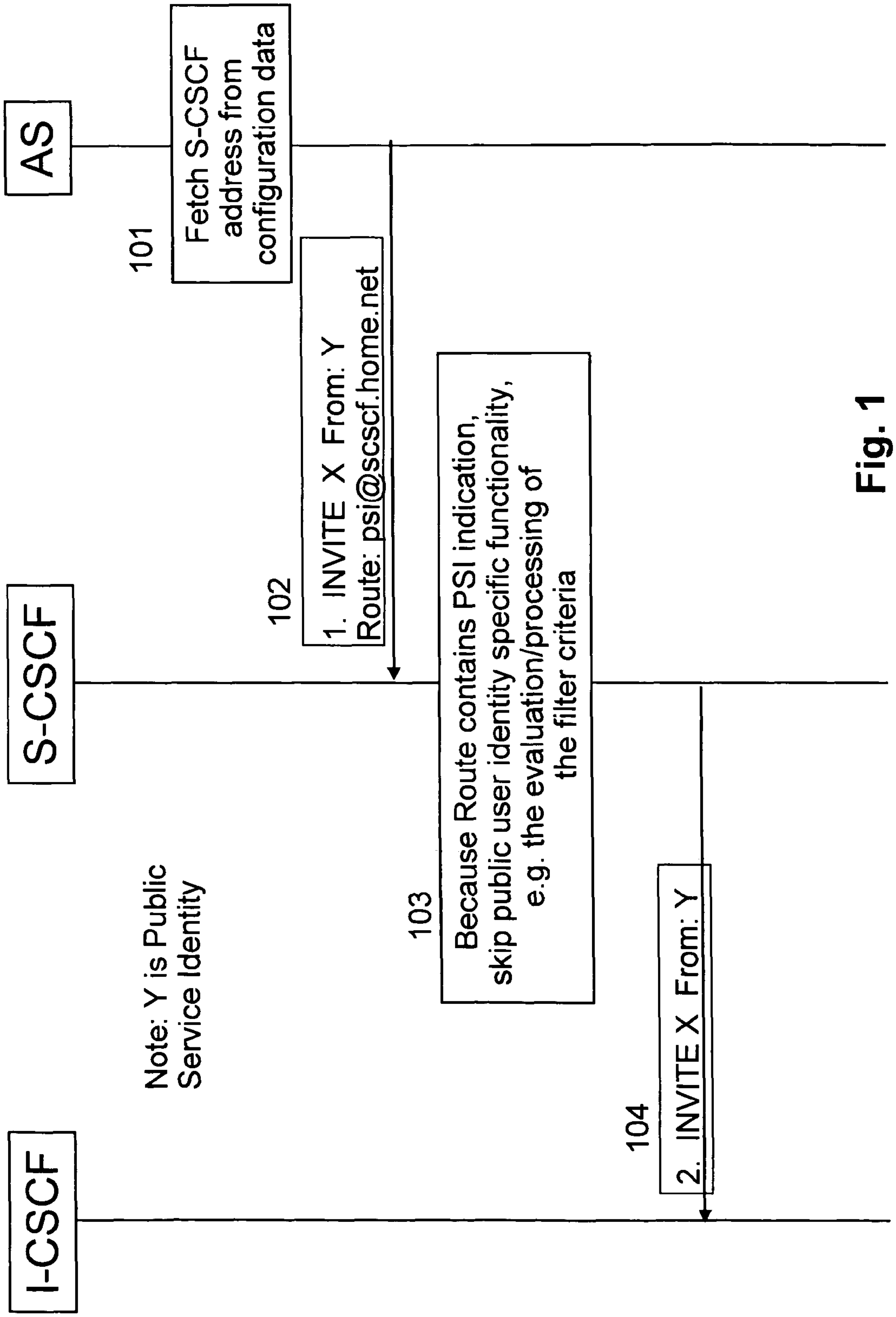
FIG. 1 shows a signaling diagram illustrating an example of a first embodiment of the invention.

The idea of the present invention is to carry information of a function mode to or from a network entity, e.g. an S-CSCF, AS, etc. PSI (public service identity), orig-PSI (originating PSI), term-PSI (terminating PSI) are examples of such modes. The indication of the function mode may be carried in whatever header or field of a message (e.g. request, response, standalone transaction etc) or in the message body or in one or more parameters of names (URIs) addresses headers or the like.

A function mode describes a function a network entity is capable to offer as a service e.g. as a routing service. According to the present invention, to get a desired service a request/response/message/transaction/session/dialog or the like may be supplemented with an indication of a desired function mode(s) or used function mode(s). If the indication indicates the desired function mode(s), the function mode(s) should be offered by the network entity that receives the respective message. If the indication indicates the used function mode(s), it is (they are) the mode(s) that was (were) used in the previous network entity and the receiving network entity should deduce its desired function mode(s) based on the used function mode(s).

An example of a used function mode indication is an indication of the service offered by the AS to the received request to avoid routing the same request again to the same AS when the AS acts as Back to Back user Agent (B2BUA). When an AS acts as B2BUA it may send a request to an S-CSCF that may route it again to the same AS based on the filter criteria used to route the request to the AS the first time. In order to avoid such loops a signal is needed that can be checked at the S-CSCF when filter criteria are applied. This signal is a used function mode included in the request sent from B2BUA to the S-CSCF. Filter criteria on S-CSCF are such that the presence of the function mode prevents routing the request again to an AS offering the same service.

According to RFC3261, a back-to-back user agent (B2BUA) is a logical entity that receives a request and processes it as a user agent server (UAS). In order to determine how the request should be answered, it acts as a user agent client (UAC) and generates requests. Unlike a proxy server, it maintains dialog state and must participate in all requests sent on the dialogs it has established. Since it is a concatenation of a UAC and UAS, no explicit definitions are needed for its behavior.

A further example is an indication of a PSI function mode associated to the response to a location query done from an I-CSCF to an SLF/HSS. The PSI function mode indicates that the identity is a valid PSI identity and the I-CSCF should act accordingly.

The function mode (whether used or desired) can be carried in a header (existing or new), in a header field, in a header or URI parameter, in a header or URI parameter value, or in a user part and/or a host part of URI, or as one or more ports, or alike, or in payload or content of a message or in any combination of these in any request/response/message/transaction/session/dialog or the like. The function mode can be carried e.g. in the user part of URI in the Route header field or Contact header field, or as a URI parameter of the URI in the Via header field or Request-URI. The user part of URI in the Route header field is used in the examples of this invention. Alternatively any other header or Request-URI could have been used in the examples.

For example AS may have two function modes: a PSI function mode and a public user identity function mode. In the PSI function mode the AS handles the message as a message to/from a PSI identity. In the public user identity function mode the AS handles the message as a message to/from a public user identity. Similarly S-CSCF may have two function modes: a PSI function mode and a public user identity function mode. In the PSI function mode the S-CSCF handles the message as a message to/from a PSI identity. In the public user identity function mode the S-CSCF handles the message as a message to/from a public user identity. AS a further example orig-PSI function mode carried in a message from an AS to an S-CSCF indicates to the S-CSCF when seen as a desired function mode that the S-CSCF should offer originating PSI service to this message i.e. handle the message as an originating message with a PSI as an originator. The orig-PSI function mode carried in a message from an AS to an S-CSCF indicates to the S-CSCF when seen as a used function mode that the S-CSCF should handle this message sent as an originating message with a PSI as an originator and that the target, i.e. the S-CSCF, should deduce what service the message needs.

According to an embodiment of the invention, an indication of a service identity is used that identifies a service hosted by an AS, such as a Public Service Identity (PSI), in routing this identity. In the following, terminating PSI routing refers to routing a request destined to a PSI, and originating PSI routing refers to routing a request originated from a PSI.

It is to be noted that the signaling diagrams shown in the figures illustrate only examples of the invention and are not exhaustive. The examples may be combined to build more complicated examples of the invention.

When an AS does not know the next hop, e.g. an S-CSCF name/address, this may be fetched from a configuration file, list, table, database or the like which is specific to one AS or common to several ASs. Alternatively it may be extracted from a received message or fetched from a database e.g. HSS. The AS may receive or fetch capabilities from these same sources and may select a possible next hop, e.g. an S-CSCF based on these capabilities. The host forwards the request to the selected S-CSCF.

Similarly, a CSCF (especially an I-CSCF) may receive or fetch capabilities from a locator entity or PSI database (PSI DB) and may select a possible next hop, e.g. an S-CSCF or AS based on these capabilities.

In IMS SIP loose routing is assumed. In the embodiments of this invention also all examples use loose routing. If strict routing would be used, Request-URI should be used instead of Route header to carry the next hop address.

In the following embodiments, although there may be several ports allocated e.g. for a session in a network entity, for simplicity here only one port is used. Moreover, session setup with INVITE is described. However, the invention is also applicable to other methods, messages and transactions.

Moreover, it should be noted that for clarity reasons the headers described in the following embodiments may not be consistent with the definition of SIP. However, from the description of the invention it will be understood how a header consistent with the definition of SIP is to be modified to attain the respective features of the present invention.

First Embodiment

PSI Indication in AS Originating PSI Routing

In the first embodiment, a signal of PSI instructing an S-CSCF to select PSI function mode to skip over public user identity specific functions e.g. current (i.e. user specific) filter criteria evaluation is used. This signal is used in an initial request issued by a host, e.g. an AS, hosting the PSI, to an S-CSCF with PSI as originator. The S-CSCF is selected with the help of configuration information of the host hosting the PSI.

The signal of PSI may be a) a character or bit string in the user part or b) a port number or c) a parameter or parameter value or d) a modification of the name/address of the next hop or e) any combination of the above (a-d)

associated with the name/address of the next hop, e.g. an S-CSCF that will be used as SIP Universal Resource Identifier (URI) in the Route header field of the initial request sent from the AS to the next hop, e.g. an S-CSCF.

The next hop, e.g. S-CSCF, name/address is fetched from a configuration file, list, table, database or the like which is specific to one AS or common to several ASs. Alternatively it may be extracted from a received message or fetched from a database e.g. HSS. The AS may receive or fetch capabilities from these same sources and may select a possible next hop, e.g. an S-CSCF based on these capabilities. The host forwards the request to the selected S-CSCF.

Examples for PSI signals according to signals a) to d) as described above are:

a) Route: psi@scscf.home.net b) Route: scscf.home.net: 22233 c) Route: scscf.home.net; psi or Route: scscf.home.net; identity-psi (the parameter may be a URI-parameter or a parameter intended to be used in the Route header field)

d) Route: psi-scscf.home.net

FIG. 1 shows a signaling diagram illustrating an example of the first embodiment. According to FIG. 1, in case an AS is going to initiate a session, in a step 101 it fetches an S-CSCF address from configuration data or the like, and in a step 102 the AS sends a SIP INVITE message to the selected S-CSCF, the message inviting X from Y, wherein Y is a Public Service Identity. In view of Y being a PSI, the AS indicates in the INVITE message that Y is a PSI by adding 'Route: psi@scscf.home.net'.

In a next step 103, the S-CSCF receiving the INVITE message detects the PSI indication in the Route header and, thus, skips all public user identity specific processing e.g. an evaluation/processing of user specific filter criteria. In a following step 104, the S-CSCF forwards the INVITE message to an I-CSCF for routing the message to X.

Second Embodiment

PSI Filter Criteria

In the second embodiment new PSI filter criteria are used, which are evaluated when the identity is a Public Service Identity (PSI) (while the current i.e. the user filter criteria are evaluated when the identity is a public user identity). PSI filter criteria are downloaded from a database FC DB. They may be downloaded at the startup of an S-CSCF or later once when first needed. Alternatively, the filter criteria may be downloaded always when needed or later if the filter criteria are not available on S-CSCF e.g. have been removed from the storage of the S-CSCF. The filter criteria may be associated with PSIs or they may be independent of PSIs. In the first case only PSI filter criteria associated with the PSI in question may be evaluated, while in the latter case all PSI filter criteria may be evaluated.

An implementation of a database containing PSI filter criteria may be e.g.

a) a simple storage containing only the independent PSI filter criteria or b) a database with PSI used as a search key with associated PSI filter criteria or c) a refined HSS type database or d) whatever between or outside a, b and c.

Cx interface may be reused here.

Figure 2:
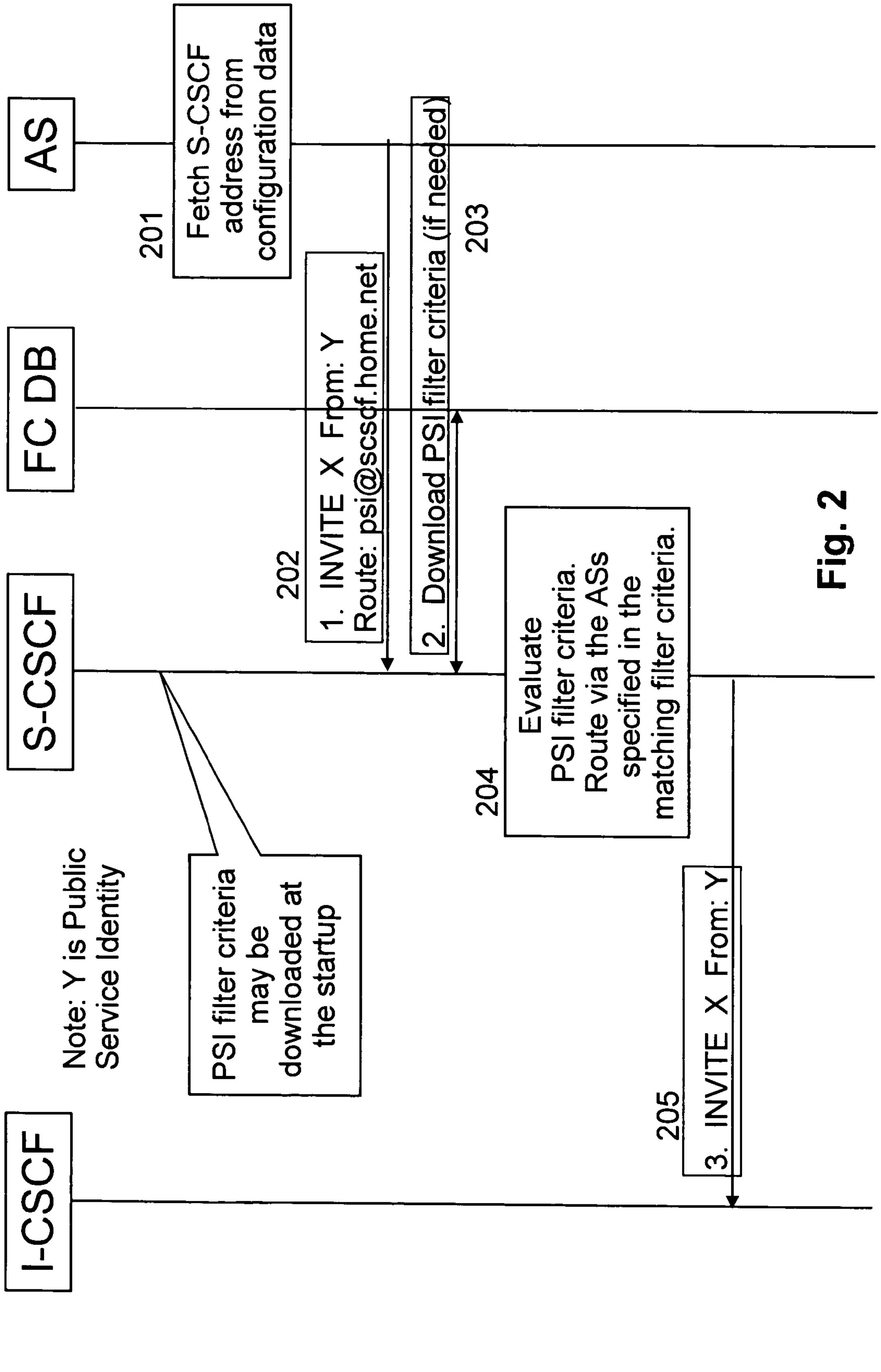
FIG. 2 shows a signaling diagram illustrating an example of a second embodiment of the invention.

FIG. 2 shows a signaling diagram illustrating an example of the second embodiment. Steps 201 and 202 correspond to steps 101 and 102 in FIG. 1. In a step 203, the S-CSCF receiving the INVITE message downloads PSI filter criteria from a filter criteria database FC DB if needed. Alternatively, the S-CSCF may download the PSI filter criteria at its startup. In a step 204 the S-CSCF evaluates the PSI filter criteria which may result in routing via ASs specified in the matching filter criteria, and in a step 205 similar to step 104 in FIG. 1, the S-CSCF forwards the INVITE message to the I-CSCF.

As already mentioned above, the further features described in this embodiment may be combined with the features of the first embodiment described above.

Third Embodiment

SLF/HSS Returns PSI Indication

In the third embodiment, a signal of PSI is used to distinguish PSI and PUI in the locator entity (e.g. SLF/HSS or similar database or alike) and to be able to interpret the name/address in the locator entity as a name/address of a target network entity (e.g. S-CSCF or AS) or as a name/address of another locator entity (e.g. HSS). A signal of PSI is used in a response to a query sent to a Subscription Locator Function/Home Subscriber Server (SLF/HSS) or similar database or the like to find a host to which a request destined to a PSI is to be routed from an I-CSCF. The signal may be sent in an initial request from the I-CSCF to the host, e.g. an S-CSCF or AS. Because of the signal, the host e.g. the S-CSCF or AS knows to handle the identity as Public Service Identity instead of Public User Identity.

The signal of PSI may be a) a character or bit string in the user part or b) a port number or c) a parameter or parameter value or d) a modification of the name/address or e) any combination of the above (a-d)

associated with the name/address of the next hop (e.g. S-CSCF) that will be used as SIP URI in the Route header field of the initial request sent from the I-CSCF to the next hop (e.g. S-CSCF).

Examples for the above PSI signals a) to d) are:

a) psi@scscf.home.net b) scscf.home.net: 22233 c) scscf.home.net; psi or scscf.home.net; identity=psi (the parameter may be a URI-parameter or a parameter intended to be used in the Route header field)

d) psi-scscf.home.net

Figure 3:
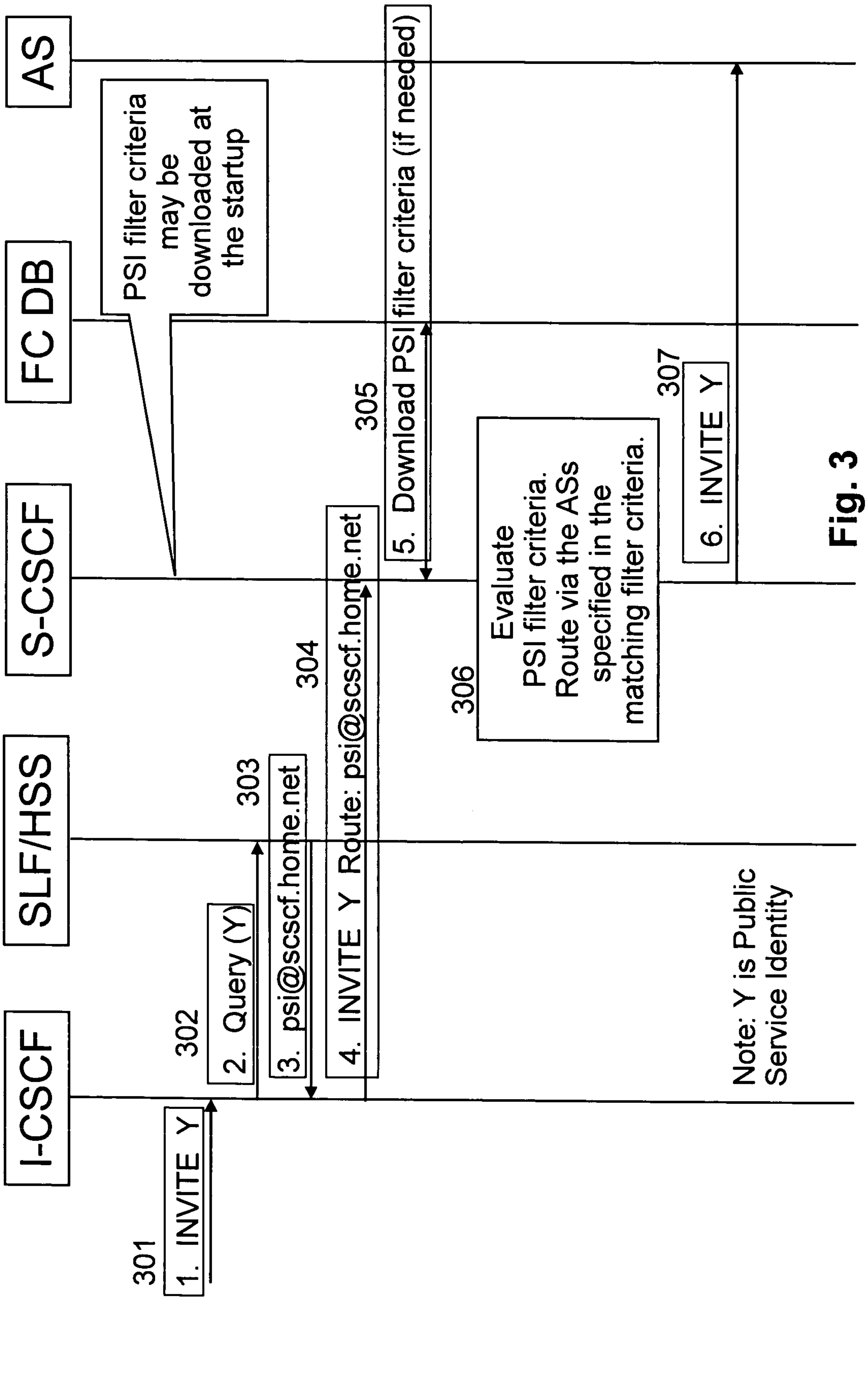
FIG. 3 shows a signaling diagram illustrating an example of a third embodiment of the invention.

FIG. 3 shows a signaling diagram illustrating an example of the third embodiment. In a step 301 an I-CSCF receives a SIP INVITE message inviting Y to a session. Upon receipt of this INVITE message, in a step 302 the I-CSCF conducts a query on Y in an SLF/HSS. In a step 303, the SLF/HSS returns a message comprising a PSI indication 'psi@scscf.home.net' including the next hop address, i.e. the address of an S-CSCF, to the I-CSCF.

Then, in a next step 304, the I-CSCF routes the INVITE message to the S-CSCF indicated in the message received from the SLF/HSS, the INVITE message including the PSI indication in the Route header field. Upon receiving the INVITE message from the I-CSCF, the S-CSCF may download PSI filter criteria in a step 305. Alternatively, the filter criteria may also have been downloaded at the startup of the S-CSCF. In a step 306 corresponding to step 204 in FIG. 2, the S-CSCF evaluates the downloaded PSI filter criteria. This may result in routing via ASs specified in the matching filter criteria. In step 307, the S-CSCF routes the INVITE message to the AS hosting Y.

It is to be noted that SLF/HSS is a locator entity, e.g. a location database that may comprise SLF alone, or HSS alone, or may comprise SLF and HSS.

As already mentioned above, the further features described in this embodiment may be combined with the features of the embodiments described above.

Fourth Embodiment

PSI Indication in AS Terminating PSI Routing

In the fourth embodiment a signal of PSI is used (similar as in the third embodiment) in the requests routed from an S-CSCF to a host (e.g. AS) hosting the PSI. The signal is sent in the initial request from the S-CSCF to the host to tell the host to select PSI function mode. On the basis of the signal the host knows to handle the identity as Public Service Identity instead of Public User identity. In case the routing is carried out directly from an I-CSCF to the host (e.g. AS), the I-CSCF inserts the signal of PSI according to the third embodiment.

The implementation of the fourth embodiment is similar to the implementation of the first embodiment.

Figure 4:
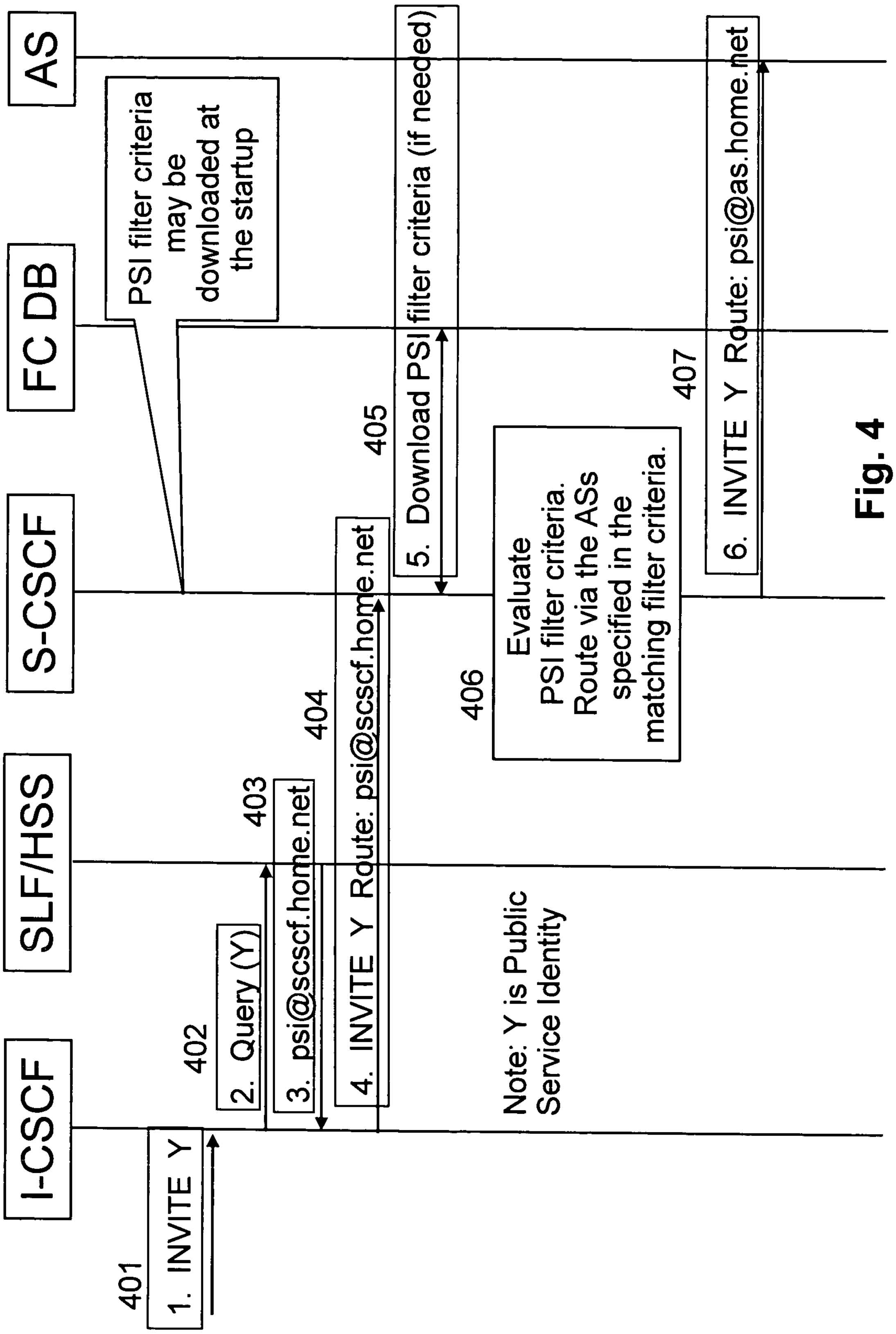
FIG. 4 shows a signaling diagram illustrating an example of a fourth embodiment of the invention.

FIG. 4 shows a signaling diagram illustrating an example of the fourth embodiment. Steps 401 to 406 correspond to the steps 301 to 306 in FIG. 3. The difference between FIG. 3 and FIG. 4 is in step 407, in which the S-CSCF indicates to the AS in the Route header field that Y is a Public Service Identity.

As already mentioned above, the further features described in this embodiment may be combined with the features of the embodiments described above.

Fifth Embodiment

Separate Originating and Terminating PSI Filter Criteria

In the fifth embodiment, an additional signal is used which indicates whether the desired function mode should be originating or terminating mode e.g. whether the originating or terminating PSI filter criteria are to be evaluated at the S-CSCF.

The signal may be comprised of at least one or two different a) character or bit strings used in the user part and associated to the originating and terminating case or b) port numbers associated to the originating and terminating case or c) parameters or parameter values associated to the originating and terminating case or d) modifications of the name/address associated to the originating and terminating case or e) any combinations of the above (a-d)

and associated with the name/address of the S-CSCF expressed as SIP URI in the Route header field of the initial request sent to the S-CSCF from the AS or I-CSCF respectively. The signal may also be associated with the name/address of the AS or I-CSCF expressed as SIP URI e.g. in the Contact or Via header field of the initial request sent to the S-CSCF from the AS or I-CSCF respectively.

Examples of signals used in the originating cases:

a) Route: orig-psi@scscf.home.net b) Route: scscf.home.net: 22233 c) Route: scscf.home.net; psi-orig or Route: scscf-.home.net; identity=psi-orig (the parameter may be an URI-parameter or a parameter intended to be used in the Route header field)

d) Route: orig-psi-scscf.home.net e) Route: orig-psi@scscf.home.net: 22233

Examples of signals used in the terminating cases:

a) Route: term-psi@scscf.home.net b) Route: scscf.home.net: 22244 c) Route: scscf.home.net; psi-term or Route: scscf-.home.net; identity=psi-term (the parameter may be a URI-parameter or a parameter intended to be used in the Route header field)

d) Route: term-psi-scscf.home.net e) Route: term-psi@scscf.home.net: 22244

Figure 5:
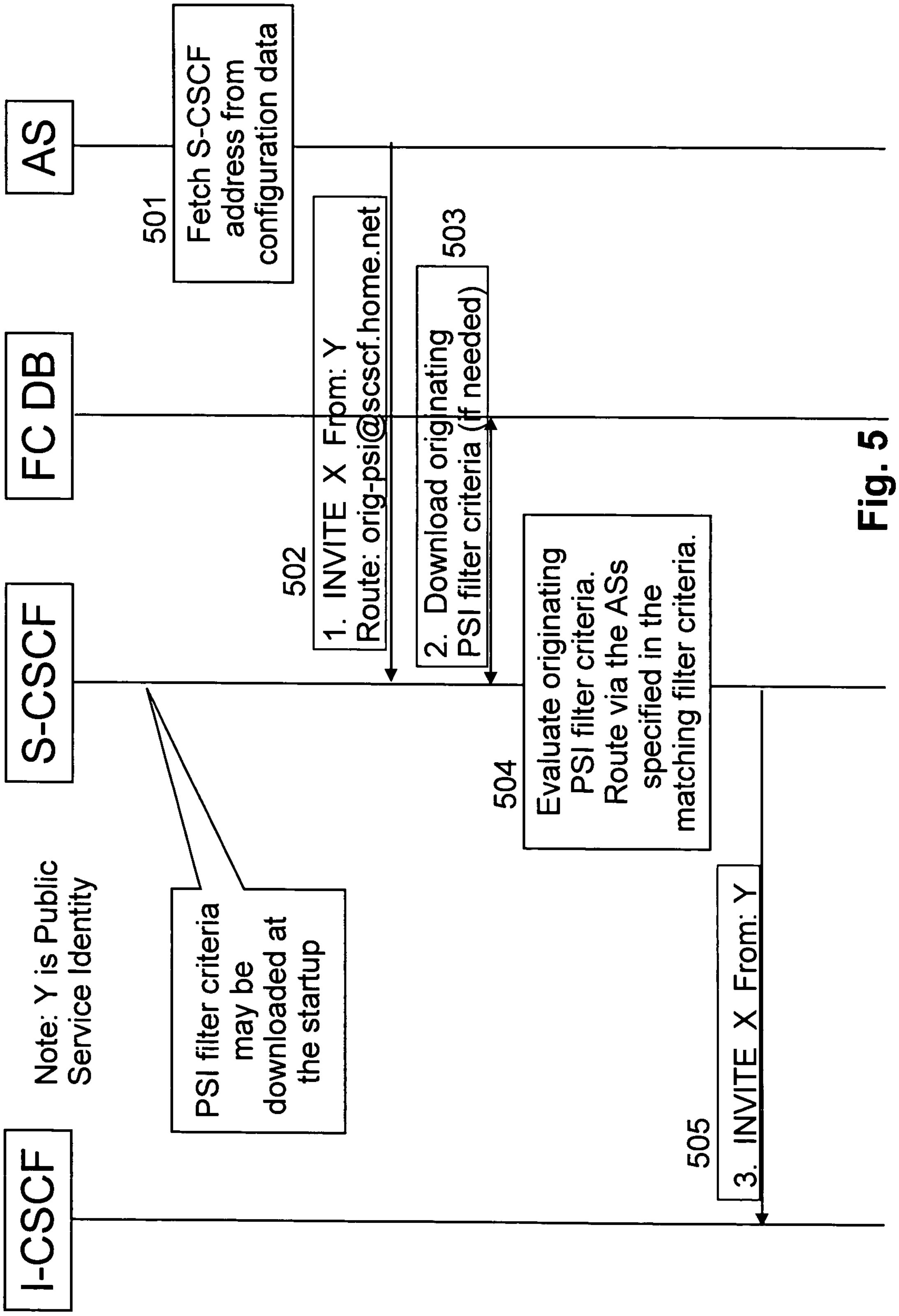
FIG. 5 shows a signaling diagram illustrating an example of a fifth embodiment of the invention in an originating case.

FIG. 5 shows a signaling diagram illustrating an example of the fifth embodiment according to the originating case. The first step 501 corresponds to step 101 in FIG. 1. In step 502, the AS sends an INVITE message to the S-CSCF in which in the Route header field an originating PSI signal 'Route: orig-psi@scscf.home.net' is included. Upon receipt of this signal, the S-CSCF may download originating PSI filter criteria from a filter criteria database FC DB in step 503. Then, in step 504 the S-CSCF evaluates the downloaded originating PSI filter criteria. On the basis of the matching filter criteria, the S-CSCF may perform routing via ASs specified therein. In step 505 corresponding to step 104 in FIG. 1, the S-CSCF forwards the INVITE message to an I-CSCF.

Figure 6:
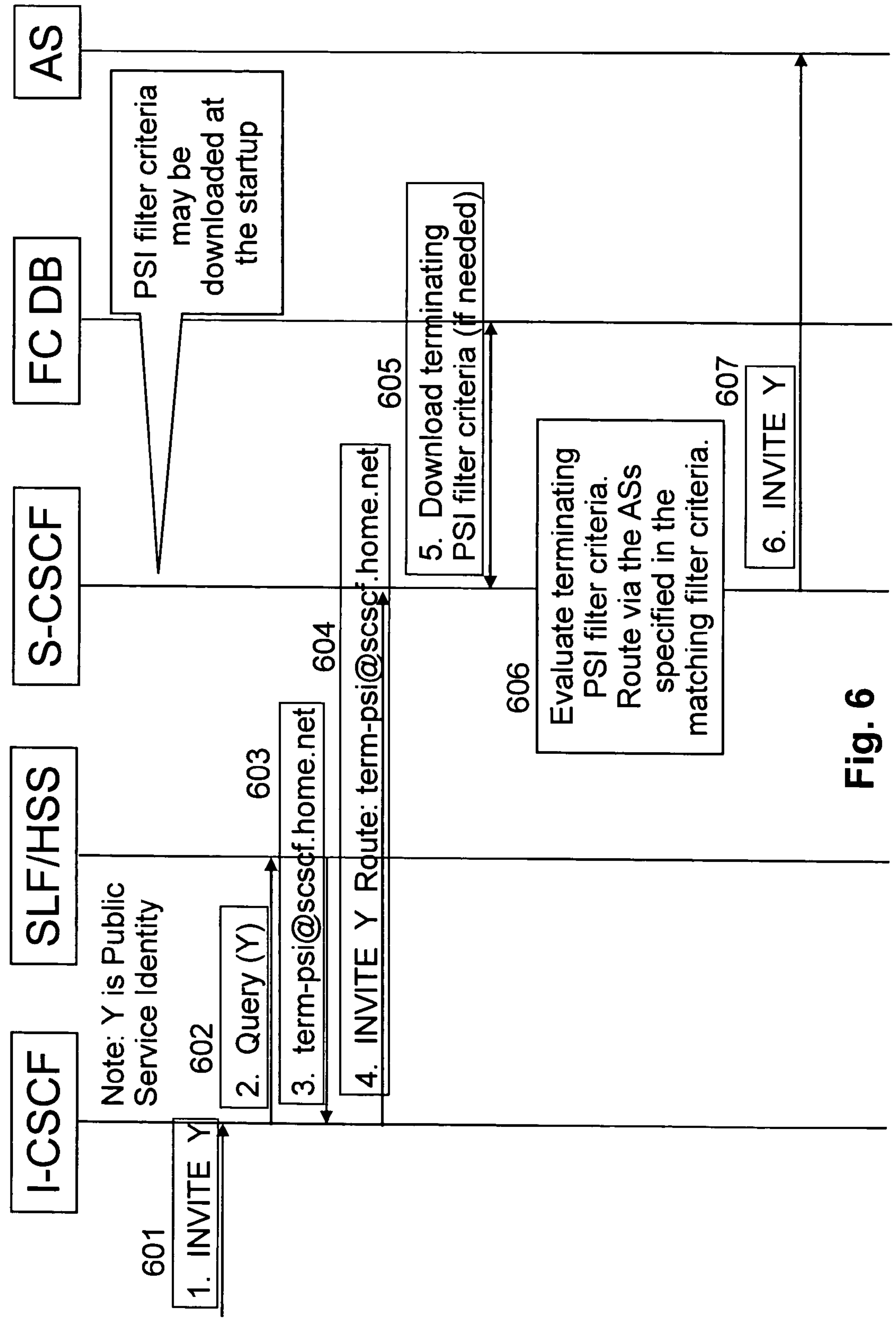
FIG. 6 shows a signaling diagram illustrating an example of the fifth embodiment of the invention in a terminating case.

FIG. 6 shows a signaling diagram illustrating an example of the fifth embodiment according to the terminating case. Steps 601 and 602 of FIG. 6 correspond to steps 301 and 302 in FIG. 3. In step 603, the SLF/HSS returns a terminating PSI signal 'term-psi@scscfhome.net' to the I-CSCF in response to the query on Y made by the I-CSCF. The PSI signal tells that this is PSI, not PUI. In step 604, the I-CSCF routes the INVITE message to the S-CSCF indicated in the query response, the message including in the Route header field the terminating PSI indication. Upon receiving the INVITE message, the S-CSCF knows to select terminating PSI mode and downloads terminating PSI filter criteria in step 605 if needed. In step 606 the S-CSCF evaluates the downloaded terminating PSI filter criteria. Apart from this, the S-CSCF may perform the same processes as in step 204 of FIG. 2. In step 607 corresponding to step 307 in FIG. 3 the S-CSCF routes the INVITE message to the AS hosting Y.

As already mentioned above, the further features described in this embodiment may be combined with the features of the embodiments described above.

Sixth Embodiment

PSI Database

In the sixth embodiment a database containing PSIs is used. The database may also contain PSI filter criteria. PSIs are normally not registered. A PSI is simply inserted into the database when it is needed or beforehand. A PSI may be created, modified and removed in/from the database by the host e.g. the AS that hosts the PSI in question, as well as by the operator e.g. with network operation and management tools/interface. A PSI may be hosted by one or more hosts. For example, one AS may host a PSI to offer a message list (i.e. message forwarding) service and another AS may host the same PSI to offer a conference service.

The entries in the database may have the same or different structure as in a HSS. PSI filter criteria may be linked to PSIs e.g. via service profiles analogously as user filter criteria are linked to Public User Identities in the HSS. Cx and Sh interfaces may be reused here.

Figure 7:
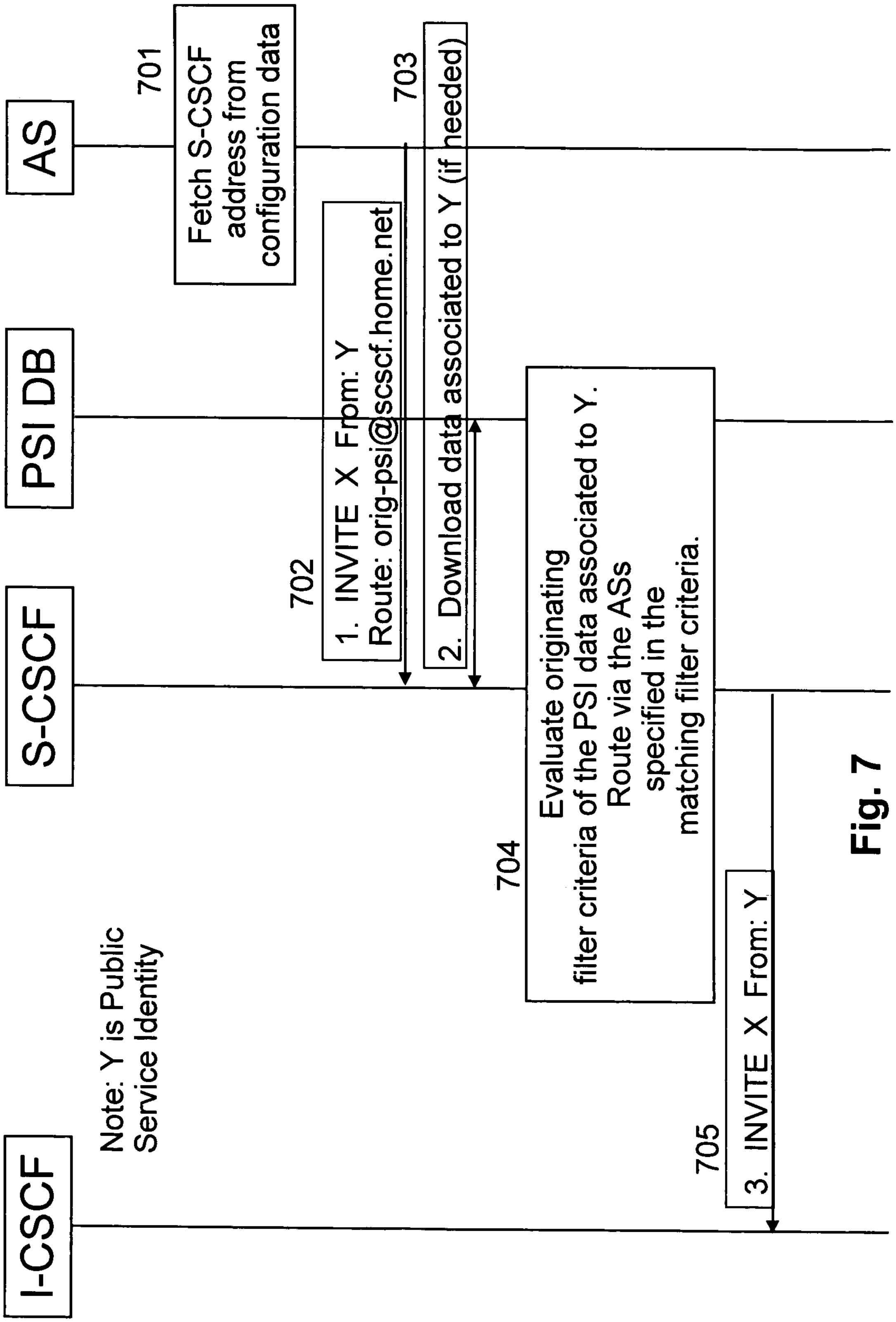
FIG. 7 shows a signaling diagram illustrating an example of a sixth embodiment of the invention in an originating case.

FIG. 7 shows a signaling diagram illustrating an example of the sixth embodiment in an originating case. Step 701 corresponds to step 101 in FIG. 1. In step 702, the AS sends an INVITE message inviting X from Y (i.e. the sender) to the S-CSCF. In the INVITE message, the AS has included in the Route header field the originating PSI indication.

In step 703, upon receiving the INVITE message, the S-CSCF downloads data associated with Y (i.e. the sender) from a PSI database PSI DB if needed. In step 704, the S-CSCF evaluates originating filter criteria of the downloaded PSI data associated with Y. The S-CSCF may perform routing via ASs specified in the matching filter criteria. In step 705 the S-CSCF forwards the INVITE message to an I-CSCF for further routing.

Figure 8:
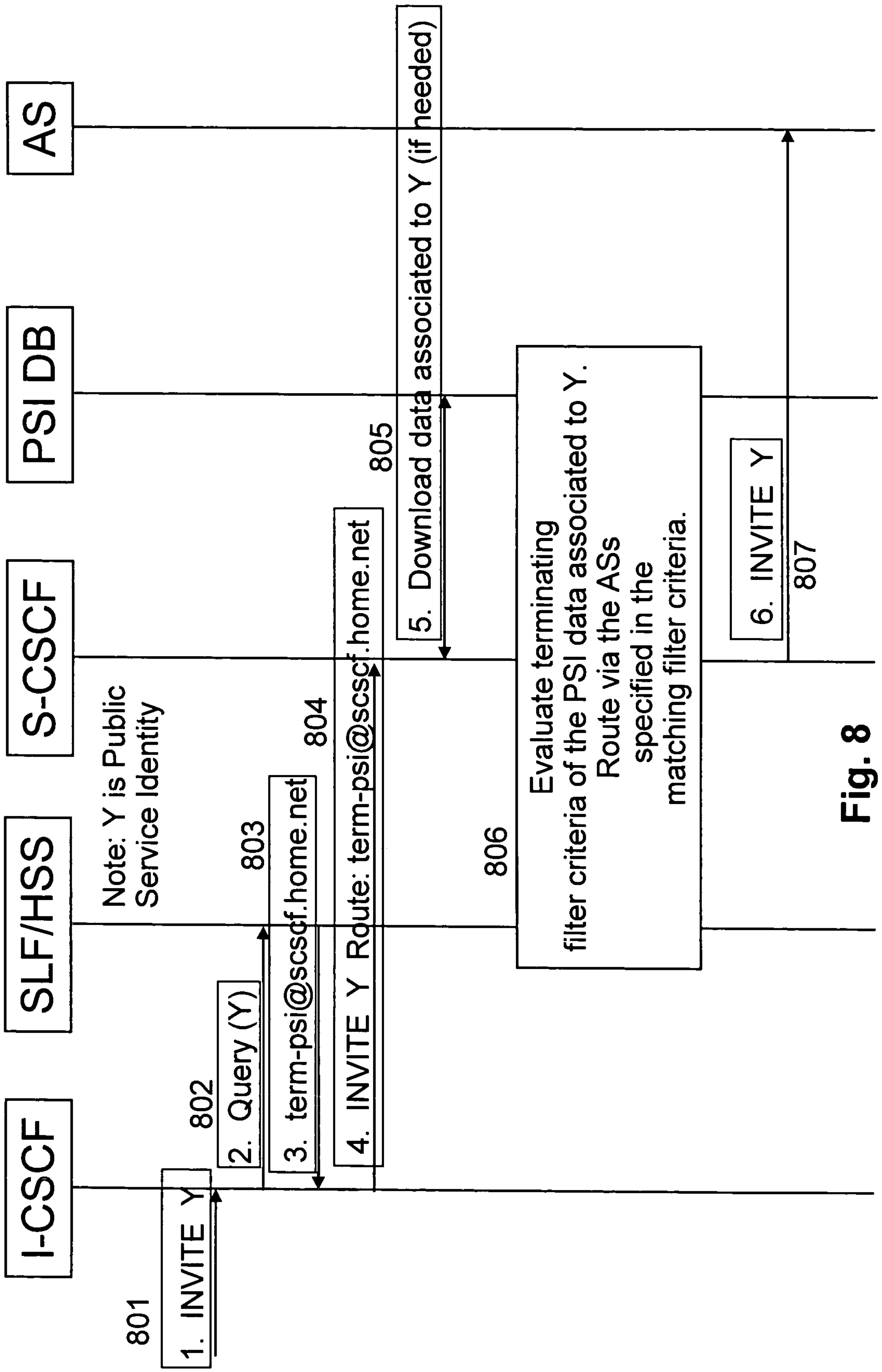
FIG. 8 shows a signaling diagram illustrating an example of the sixth embodiment of the invention in a terminating case.

FIG. 8 shows a signaling diagram illustrating an example of the sixth embodiment in a terminating case. In step 801, an I-CSCF receives an INVITE message inviting Y to a session. In step 802, the I-CSCF conducts a query on Y in an SLF/HSS. The SLF/HSS returns a terminating PSI indication with the next hop address to the I-CSCF in step 803, and the I-CSCF routes the INVITE message with the terminating PSI signal to the S-CSCF indicated in the query return message. The steps 801 to 804 correspond to steps 601 to 604 in FIG. 6.

Upon receiving the INVITE message, in step 805 the S-CSCF downloads data associated with Y from a PSI database PSI DB if needed. In step 806, the S-CSCF evaluates terminating filter criteria of the downloaded PSI data associated with Y. The S-CSCF may perform routing via the ASs specified in the matching filter criteria. In step 807 corresponding to step 307 of FIG. 3 the S-CSCF routes the INVITE message to the AS hosting Y.

As already mentioned above, the further features described in this embodiment may be combined with the features of the embodiments described above.

Seventh Embodiment

PSI Database with S-CSCF Name/Address

The seventh embodiment is equal to the sixth embodiment except that an S-CSCF name/address is stored in the PSI DB.

In the terminating case, when a request arrives at an I-CSCF, the I-CSCF conducts an SLF/HSS query. If the identity is a PSI identity, the SLF/HSS returns an address of a PSI DB to the I-CSCF. A new query is done towards the PSI DB to find the name/address of a responsible S-CSCF. If no address is stored the PSI DB may return capabilities and the I-CSCF may select an S-CSCF based on these capabilities if they were received. The I-CSCF forwards the request to the selected S-CSCF. The S-CSCF stores its name/address in the PSI DB and downloads PSI Filter Criteria (FC). The S-CSCF evaluates the FC and if match is found forwards the request via the associated ASs like it does with a request destined to a public user identity.

In case there is an S-CSCF name/address stored in the PSI DB the I-CSCF forwards the request to the respective S-CSCF. If the S-CSCF has already downloaded the PSI FC and these are still available, it continues evaluating the FC as described above. If the PSI FC are not available, the S-CSCF downloads the PSI FC first.

In the originating case, if a host (e.g. an AS) hosting the PSI is not aware of the name/address of an S-CSCF that is associated to the PSI, it performs a query to a PSI DB. If it does not get an address, it may receive capabilities and may select a possible S-CSCF based on these capabilities. The host forwards the request to the selected S-CSCF. The S-CSCF acts similarly as in the terminating case, i.e. the S-CSCF stores its name/address to the PSI DB and downloads PSI FC. The S-CSCF evaluates the FC and if match is found forwards the request via the associated ASs like it does with requests originated by a public user identity.

In case there is an S-CSCF name/address stored in the PSI DB the host forwards the request to the respective S-CSCF. If the S-CSCF has already downloaded the PSI FC and the PSI FC are still available, it continues evaluating the FC as described above. If the PSI FC are not available, the S-CSCF downloads the PSI FC first.

The entries in the PSI database may have the same or different structure as in an HSS. PSI filter criteria may be linked to PSIs e.g. via service profiles analogously as user filter criteria are linked to Public User Identities in the HSS. Cx and Sh interfaces may be reused here.

Figure 9:
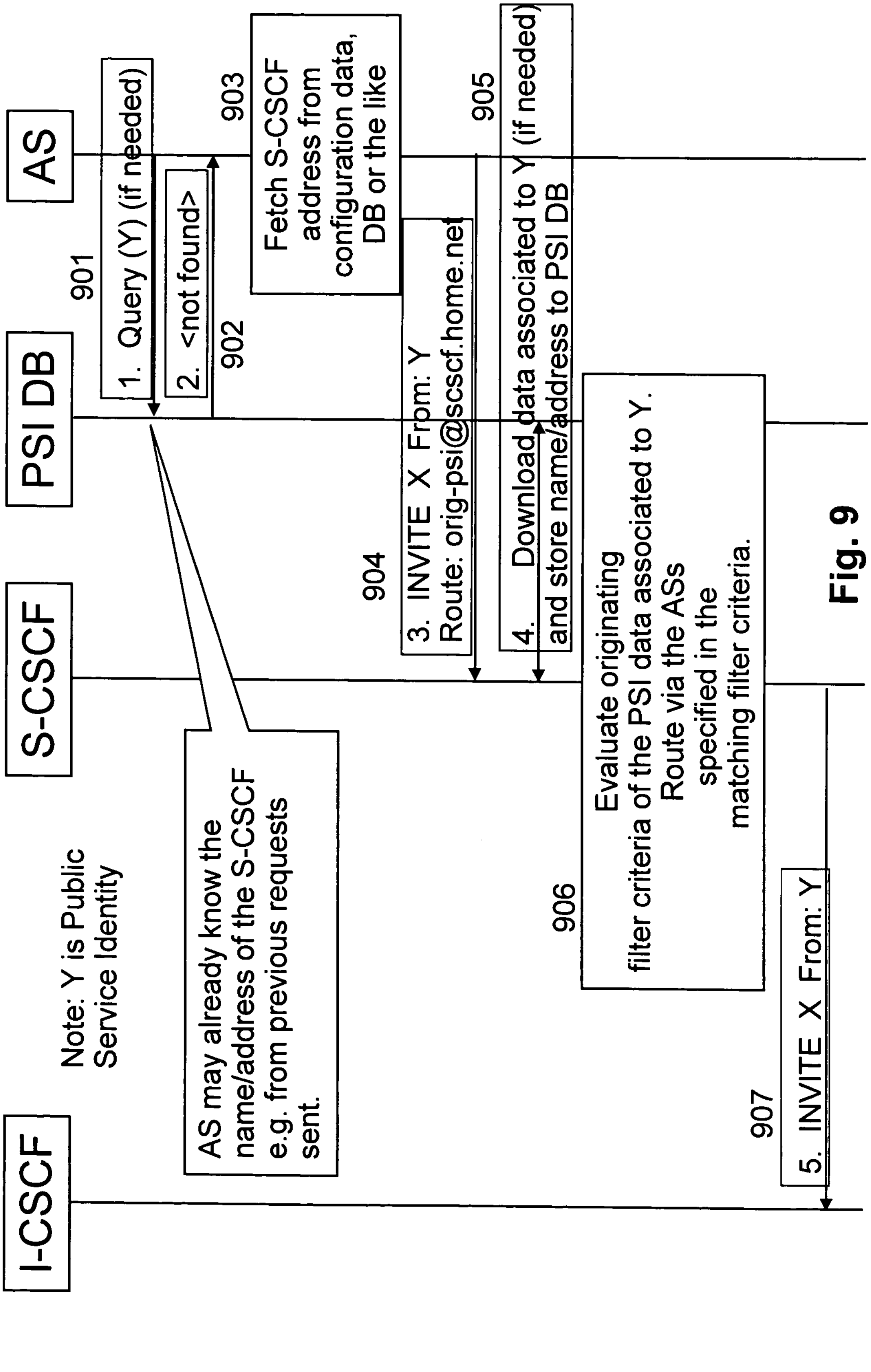
FIG. 9 shows a signaling diagram illustrating an example of a seventh embodiment of the invention in an originating case in which no S-CSCF name/address is found.

FIG. 9 shows a signaling diagram illustrating an example of the seventh embodiment in the originating case in which no S-CSCF name/address is found in a PSI database.

In FIG. 9, in step 901 a host or an AS hosting a PSI Y performs a query on Y in a PSI DB in order to find a name/address of an S-CSCF to be used. In step 902 the PSI DB returns no name/address e.g. because no name/address could be found in the PSI DB. Thereupon, in step 903 the AS may fetch an S-CSCF address from configuration data, a database or the like similar as in step 101 in FIG. 1. In step 904 the AS sends an INVITE message with an originating PSI signal to an S-CSCF selected in step 903, similar to step 702 in FIG. 7.

It is to be noted that the AS may already know the name/address of the S-CSCF to be used for Y e.g. from previously sent requests so that the AS can send the INVITE message directly to the respective S-CSCF. Alternatively the AS may receive capabilities in the step 902 and may select a suitable S-CSCF based on the capabilities.

Upon receiving the INVITE message at the S-CSCF selected in step 903, in step 905 the S-CSCF stores its name/address in the PSI DB and downloads data associated with Y from the PSI DB if needed. In step 906 corresponding to step 704 in FIG. 7, the S-CSCF evaluates originating filter criteria of the downloaded data associated with Y and if match is found forwards the request via the associated ASs. In step 907 the S-CSCF forwards the INVITE message to an I-CSCF for further routing.

Figure 10:
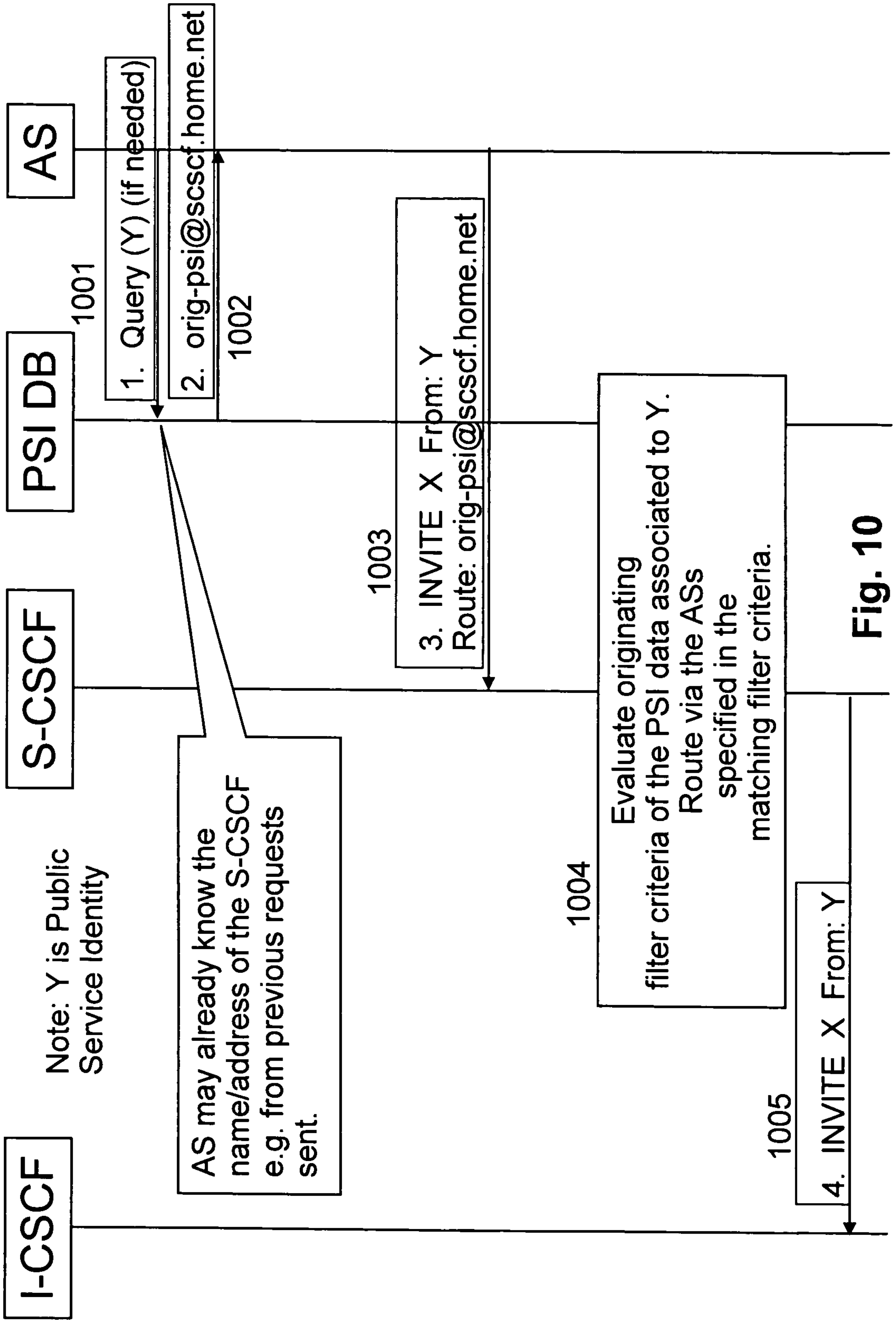
FIG. 10 shows a signaling diagram illustrating an example of the seventh embodiment of the invention in an originating case in which an S-CSCF name/address is found.

FIG. 10 shows a signaling diagram illustrating an example of the seventh embodiment in the originating case in which an S-CSCF name/address is found in the PSI DB.

In FIG. 10, steps 1001 and 1003 to 1005 correspond to steps 901, 904, 906 and 907 of FIG. 9, respectively. The difference between the situation shown in FIG. 10 and that shown in FIG. 9 is that upon the query on Y, in step 1002 the PSI DB returns a message comprising an originating PSI indication and the name/address of the S-CSCF to be used. Alternatively in the step 1002 only the name/address of the S-CSCF is returned, and the function mode "orig-psi" is inserted to the message by the AS. Then, in step 1003 the AS sends the INVITE message to the indicated S-CSCF. Moreover, upon receiving the INVITE message the S-CSCF does not need to download the FC or PSI data associated with Y because it has already stored them, and is able to continue directly with the FC evaluation. However, if the FC and/or PSI data is not available anymore, the S-CSCF downloads the needed information from the PSI DB.

Figure 11:
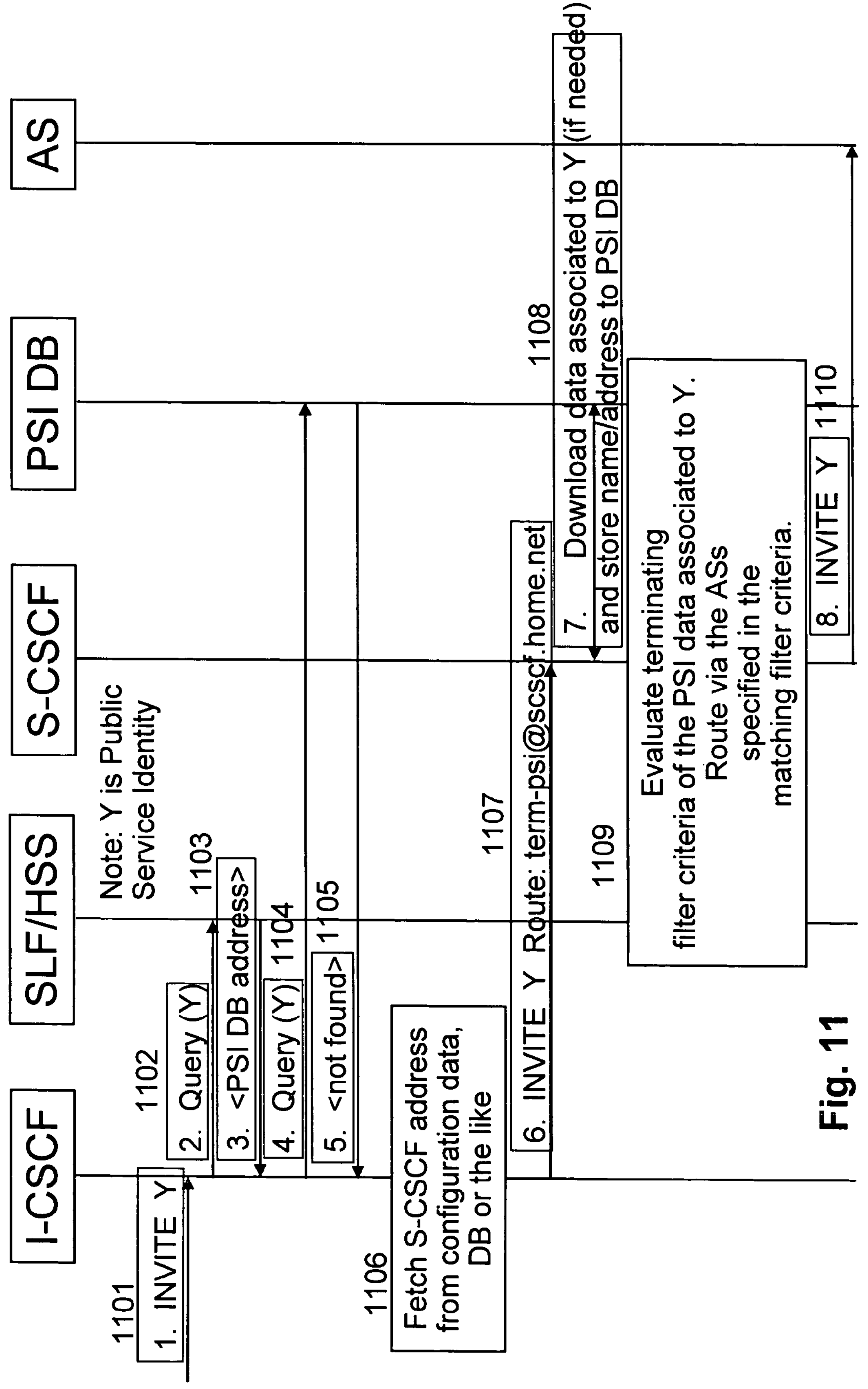
FIG. 11 shows a signaling diagram illustrating an example of the seventh embodiment of the invention in a terminating case in which no S-CSCF name/address is found.

FIG. 11 shows a signaling diagram illustrating an example of the seventh embodiment in the terminating case in which no S-CSCF name/address is found in the PSI DB.

Upon receiving an INVITE message inviting Y in step 1101, an I-CSCF performs a query on Y in an SLF/HSS in step 1102, which query returns a PSI DB address in step 1103. Thereupon, the I-CSCF queries the respective PSI DB on Y in step 1104. In step 1105 the I-CSCF receives a message from the PSI DB indicating that no name/address of an S-CSCF to be used for Y could be found in the PSI DB. Thus, in step 1106 the I-CSCF fetches an S-CSCF address from configuration data, a database or the like and, in step 1107, routes the INVITE message to the S-CSCF selected in step 1106. Similar as described with FIG. 8, the I-CSCF indicates in the INVITE message sent to the S-CSCF the terminating PSI signal.

Alternatively I-CSCF may receive capabilities in the step 1105 and may select a suitable S-CSCF based on the capabilities.

In step 1108, upon receiving the INVITE message, the S-CSCF stores its name/address in the PSI DB and downloads data associated with Y if needed. The following steps 1109 and 1110 correspond to the steps 806 and 807 of FIG. 8.

Figure 12:
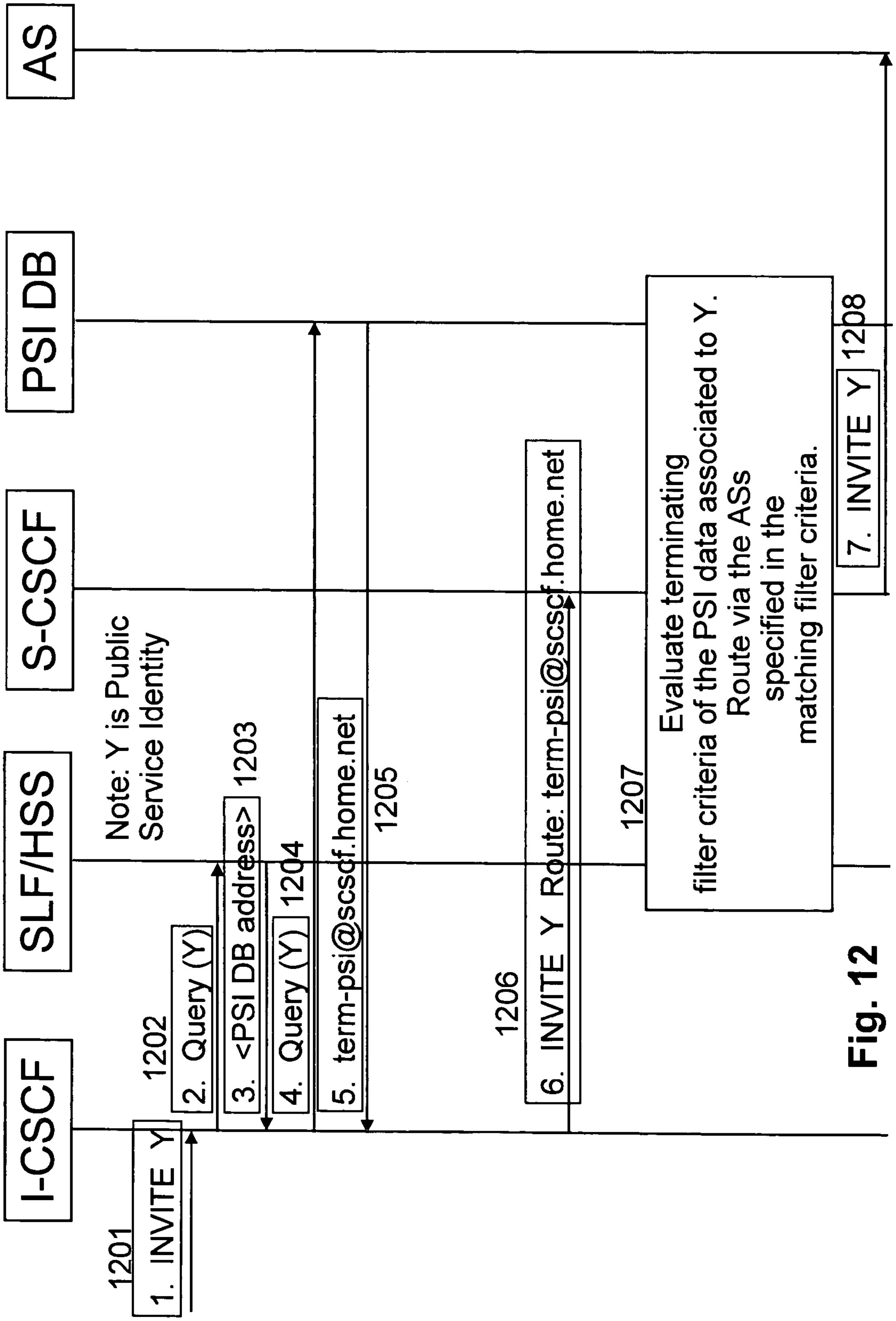
FIG. 12 shows a signaling diagram illustrating an example of the seventh embodiment of the invention in a terminating case in which an S-CSCF name/address is found.

FIG. 12 shows a signaling diagram illustrating an example of the seventh embodiment in the terminating case in which an S-CSCF name/address is found in the PSI DB.

In FIG. 12, steps 1201 to 1204 correspond to the steps 1101 to 1104 of FIG. 11. In step 1205 of FIG. 12, upon the query on Y in the PSI DB, the PSI DB returns a terminating PSI indication with the next hop address, i.e. the name/address of the S-CSCF to be used for routing the INVITE message. Alternatively in the step 1205 only the name/address of the S-CSCF is returned, and the function mode "term-psi" is inserted to the message by the I-CSCF. In step 1206, the I-CSCF forwards the INVITE message to the indicated S-CSCF together with the terminating PSI signal 'Route: term-psi@gscscf.home.net'. Upon receiving the INVITE message, because the S-CSCF has already downloaded the respective PSI data, e.g. FC, associated with Y, it continues with the evaluation of terminating filter criteria in step 1207 and then forwards the INVITE message to the AS hosting Y in accordance with the matching filter criteria in step 1208. However, if the FC and/or PSI data is not available anymore, the S-CSCF downloads the needed information from the PSI DB.

With the signal of PSI PSIs and public user identities can be differentiated always when needed. Using the PSI signal a difference in the handling of PSIs and PUIs can be made on the fly.

The above-described filter criteria may be initial filter criteria applied to initial requests as well as other filter criteria applied to other (e.g. subsequent) requests.

As already mentioned above, the further features described in this embodiment may be combined with the features of the embodiments described above.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method, comprising:

receiving, at a network entity, a first session initiation protocol invite request in which at least one of an originator identity and a destination identity of the first session initiation protocol invite request comprises a public service identity;

detecting, at the network entity, the public service identity included in the first session initiation protocol invite request to enable processing the first session initiation protocol invite request in accordance with a function mode defined by public service identity rather than a public user identity defining another function mode at the network entity;

receiving, at the network entity, at least one filter criteria for the public service identity; and sending, by the network entity based on the at least one filter criteria, a second session initiation protocol invite request to an application server, the second session initiation protocol invite including the public service identity defining the function mode at the application server.

2. The method of claim 1, wherein the network entity skips processing over another filter criteria associated with the public user identity defining the other function mode at the network entity.

3. The method of claim 1, wherein the receiving the at least one filter criteria is in response to the detecting the public service identity included in the session initiation protocol invite request.

4. The method of claim 1, wherein the network entity comprises a call state controller.

5. The method of claim 1, wherein the at least one filter criteria is received from a home subscriber server.

6. The method of claim 1, wherein the at least one filter criteria is received from a subscription location function.

7. The method of claim 1, wherein the first session initiation protocol invite request is received from an interrogating call state controller.

8. An apparatus, comprising:

at least one processor;

at least one memory including computer program code, the at least one memory and the computer program code configured to at least:

receive, at the apparatus, a first session initiation protocol invite request in which at least one of an originator identity and a destination identity of the first session initiation protocol invite request comprises a public service identity;

detect, at the apparatus, the public service identity included in the first session initiation protocol invite request to enable processing the first session initiation protocol invite request in accordance with a function mode defined by public service identity rather than a public user identity defining another function mode at the apparatus;

receive, at the apparatus, at least one filter criteria for the public service identity;

send, by the apparatus based on the at least one filter criteria, a second session initiation protocol invite request to an application server, the second session initiation protocol invite including the public service identity defining the function mode at the application server.

9. The apparatus of claim 8, wherein the apparatus skips processing over another filter criteria associated with the public user identity defining the other function mode at the apparatus.

10. The apparatus of claim 8, wherein the at least one filter criteria is received in response to the detecting the public service identity included in the session initiation protocol invite request.

11. The apparatus of claim 8, wherein the apparatus comprises a network entity.

12. The apparatus of claim 8, wherein the apparatus comprises a call state controller.

13. The apparatus of claim 8, wherein the at least one filter criteria is received from a home subscriber server.

14. The apparatus of claim 8, wherein the at least one filter criteria is received from a subscription location function.

15. The method of claim 8, wherein the first session initiation protocol invite request is received from an interrogating call state controller.

16. A non-transitory computer-readable storage medium including code configured to control a processor to cause operations comprising:

receiving, at a network entity, a first session initiation protocol invite request in which at least one of an originator identity and a destination identity of the first session initiation protocol invite request comprises a public service identity;

detecting, at the network entity, the public service identity included in the first session initiation protocol invite request to enable processing the first session initiation protocol invite request in accordance with a function mode defined by public service identity rather than a public user identity defining another function mode at the network entity;

receiving, at the network entity, at least one filter criteria for the public service identity; and sending, by the network entity based on the at least one filter criteria, a second session initiation protocol invite request to an application server, the second session initiation protocol invite including the public service identity defining the function mode at the application server.

* * * * *